United States Patent
Junker

(10) Patent No.: US 7,091,631 B2
(45) Date of Patent: Aug. 15, 2006

(54) INTRINSICALLY SECURE DEVICE FOR SUPPLYING REDUNDANT CURRENT-VOLTAGE

(75) Inventor: Martin Junker, Darmstadt (DE)

(73) Assignee: Pepperl & Fuchs GmbH, Mannheim-Schonau (DE)

( * ) Notice: Subject to any disclaimer, the term of this patent is extended or adjusted under 35 U.S.C. 154(b) by 111 days.

(21) Appl. No.: 10/492,916

(22) PCT Filed: Aug. 14, 2002

(86) PCT No.: PCT/EP02/09142

§ 371 (c)(1),
(2), (4) Date: Apr. 16, 2004

(87) PCT Pub. No.: WO03/034564

PCT Pub. Date: Apr. 24, 2003

(65) Prior Publication Data

US 2004/0252428 A1 Dec. 16, 2004

(30) Foreign Application Priority Data

Oct. 16, 2001 (DE) ................. 101 52 653

(51) Int. Cl.
*H02J 4/00* (2006.01)
(52) U.S. Cl. ............................................. 307/43
(58) Field of Classification Search ............ 307/43
See application file for complete search history.

(56) References Cited

U.S. PATENT DOCUMENTS

| | | | | |
|---|---|---|---|---|
| 3,813,578 A | * | 5/1974 | Tiffany | 361/88 |
| 4,122,524 A | * | 10/1978 | McCrory et al. | 705/413 |
| 4,134,050 A | * | 1/1979 | Sibalis | 318/267 |
| 4,882,501 A |   | 11/1989 | Konig et al. | |
| 5,014,156 A | * | 5/1991 | Bruch et al. | 361/58 |
| 5,113,303 A | * | 5/1992 | Herres | 361/45 |
| 5,563,456 A | * | 10/1996 | Berger | 307/66 |
| 5,710,552 A | * | 1/1998 | McCoy et al. | 340/870.21 |
| 6,133,822 A | * | 10/2000 | Pfandler et al. | 375/258 |
| 6,750,808 B1 | * | 6/2004 | Faust | 342/124 |
| 6,879,060 B1 | * | 4/2005 | Hohri | 307/64 |
| 2001/0043057 A1 | * | 11/2001 | Munck | 323/268 |
| 2004/0080890 A1 | * | 4/2004 | Ramsay et al. | 361/93.1 |
| 2004/0174648 A1 | * | 9/2004 | Frey et al. | 361/90 |

FOREIGN PATENT DOCUMENTS

| | | |
|---|---|---|
| DE | 44 03 961 | 4/1994 |
| DE | 200 05 927 | 3/2000 |
| EP | 0 666 631 | 8/1995 |

* cited by examiner

*Primary Examiner*—Brian Sircus
*Assistant Examiner*—Daniel Cavallari
(74) *Attorney, Agent, or Firm*—Jacobson Holman PLLC

(57) ABSTRACT

A device for intrinsically safe, redundant current-voltage supply for electric loads in an explosion-proof area. The device includes at least two supply circuits for making available the current/voltage supply and a protective device for intrinsically safe current and voltage limitation of the power supplied by the supply circuits to the load in the explosion-proof area. The supply circuits are connected in parallel to one another and the protective device has at least one resistive current limiting device for intrinsic safety in parallel-active supply circuits.

23 Claims, 7 Drawing Sheets

INTRINSICALLY SECURE DEVICE FOR SUPPLYING REDUNDANT CURRENT-VOLTAGE

Figure 1A:
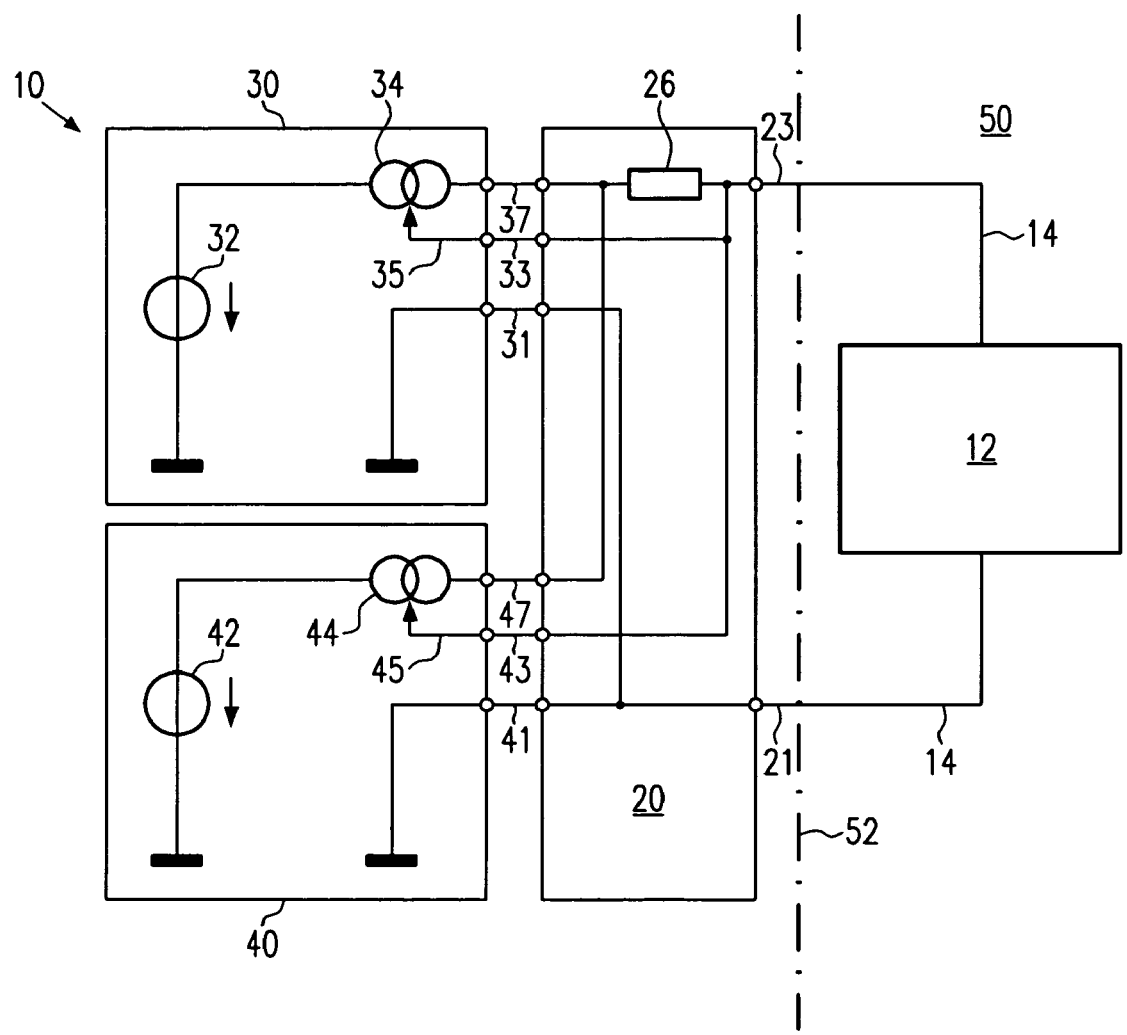

This is a nationalization of PCT/EP02/09142 filed Aug. 14, 2003 and published in German.

The present invention relates to a device for intrinsically safe, redundant current-voltage supply for one or more electric loads in an explosion-proof area (zone 0) according to the preamble of claim 1.

A device according to the preamble has at least two supply circuits for making available the current/voltage supply and a protective device for the intrinsically safe power limitation of the current supplied by the supply circuits to the load in the explosion-proof area.

Such devices are known and are used in installations in which parts of the resources are operated in the explosion-proof area. The supply devices can be integrated into input/output units and can be looked upon as a link between an external computing unit of a memory programmable control and sensors and/or actuators in the explosion-proof area.

Resources in installation parts declared to be an explosion-proof area must fulfil certain requirements which are laid down in European standard EN 500 20.

One possibility indicated in EN 500 20 for operating resources in the explosion-proof area is so-called "intrinsic safety". The energy supplied is limited in such a way that no ignitable spark can arise.

In order to limit the energy both the current and the voltage must be limited. The possibilities for implementing this in detail are also governed by EN 500 20.

With regard to the explosion-proof area in Europe there is a differentiation into so-called zones. A distinction is made between zones 0, 1 and 2, the strictest demands arising for zone 0, because here a permanently explosive atmosphere is assumed. Only a resistive current limitation is permitted in this area. Thus, only resistors, but no electronic limiting means are accepted for current limitation purposes. Thus, in the case of an input/output unit, in which a current is to be guided in the explosion-proof area in zone 0, this current must be limited by one or more resistors, which also have to fulfil certain requirements.

The functionality or availability of input/output units can be significantly increased in the explosion-proof area if they are redundantly supplied. Thus, the current circuit in the explosion-proof area (zones 0, 1 or 2) also known as the field circuit, is connected to at least two supply circuits having the same function, one supply circuit being active and the second supply circuit in standby. If a fault occurs in the active device, there is automatically a switching to the second device, without there being any significant interference to the process.

Obviously even with such a redundant supply of input/output units in the explosion-proof area, the respective safety and security requirements must be fulfilled, e.g. "intrinsic safety". The intrinsic safety can e.g. be maintained in that a switching takes place between the two supply circuits, so that in each case only one supply circuit is connected to the explosion-proof area. To ensure that there is no faulty parallel connection of the two supply circuits, in which "intrinsic safety" would no longer occur due to the addition of the currents of the two modules, in this case a safety requirement is applied to the switching device used. For this purpose additional components are needed, which leads to a rise in the construction effort and expenditure. The redundant current-voltage supply device can be designed in such a way that it can be used at least in zones 1 or 2.

The object of the present invention is to provide a device for intrinsically safe, redundant current-voltage supply, in which the relevant safety requirements can be fulfilled with particularly simple means.

This object is achieved by a device for intrinsically safe, redundant current-voltage supply having the features of claim 1.

Advantageous further developments of the device according to the invention form the subject matter of the subclaims.

According to the invention, a device of the aforementioned type is further developed in that the supply circuits are in parallel to one another and the protective device has at least one means for resistive current limitation for intrinsic safety in the case of parallel-active supply circuits.

A fundamental idea of the invention is that by means of the protective device the power introduced into the explosion-proof area and in particular the current introduced into said area, can be limited to the values necessary for intrinsic safety even with hard-wired, parallel-connected supply circuits. Thus, redundancy is obtained in that the supply circuits are connected in parallel, and as a result of the inventive construction a current rise above the maximum permitted value for intrinsic safety is avoided.

An essential advantage of the device according to the invention is that unlike in the redundant supplies hitherto implemented in the prior art, even in the case of hard-wired supply circuits the intrinsic safety level requirement is satisfied at all times.

Linked therewith is a further important advantage that a safety or security requirement for any switching device which may have to be used is obviated and therefore constructional effort can be reduced.

The supply circuits can in each case have a modular construction and are then referred to as supply modules.

In a particularly preferred development of the invention, the resistive current limiting device has at least one ohmic resistor.

In another particularly preferred development of the invention a plug module is provided between the supply circuits and the terminals of the load in the explosion-proof area. As a result there are numerous connection possibilities and also any damaged or failed modules can be very easily replaced without the operation of the device having to be interrupted.

In an appropriate manner, in particular the parallel connection of the supply circuits takes place in the plug module. As a result of this measure a replacement of a supply circuit or module can take place by simply unplugging the old circuit or module and plugging in the new circuit or module and no further connection measures are necessary. Advantageously the plug module is in particular constructed with a plurality of plugging locations for the supply circuits or modules.

Advantageously the resistive current limiting device can be provided in the plug module for limiting the currents of the supply circuits. In this way components of the resistive current limiting device can be removed from the supply circuits and consequently the latter can have a simpler layout.

However, it is also possible for the resistor of the resistive current limiting device to be partly provided in each supply circuit and in the plug module. As a result and compared with the embodiment in which the resistor essential for the resistive current limiting device is located in the plug module, the power converted in the latter can be reduced.

However, cases are also conceivable where, e.g. for geometrical reasons, the volume of the plug module is to be kept as small as possible. There, a construction is appropriate in which, for resistive current limitation, a corresponding resistor is associated with each supply circuit.

In order to keep as small as possible the components for the resistive current limiting device, particularly the ohmic resistor or resistors, the power converted in said resistors must be reduced as much as possible. For this purpose, it is possible that each supply circuit has as a protective device at least one electronic power limiting device.

Preference is e.g. given to a construction in which the power limiting device is constructed as a current control or limiting means and in which the current is determined by means of a voltage drop at a resistor of the supply circuit and/or a resistor of the plug module. As the resistors are very reliable, passive components, a very reliable current limitation can be obtained in this way.

In view of European standard EN 500 20, it is appropriate to adopt inventive constructions in which the voltage dropping at the resistor of the resistive current limiting device or power loss is designed for a maximum of ⅔ of the permitted limits for the resistor.

A further increase in safety can be brought about if the power limiting device is designed in a multiply redundant and in particular triple redundant manner.

Thus, the power limitation is ensured even with two random faults or failures.

It is also preferable if the power limiting devices are designed according to European standard EN 500 20.

A resistor for limiting the current provided in the supply circuit to the exterior is as effective as an increase in the internal resistance of a voltage source. In order to avoid an undesired drop of the voltage existent at the output terminals of the device, particularly the plug module, in the load case it is possible to provide an output voltage increasing device in the case of load. There can also be an output voltage limiting device for no-load operating conditions.

Admittedly the inventive device in accordance with the aforementioned fundamental principle is designed in such a way that the power introduced into the explosion-proof area is limited to the values necessary for intrinsic safety in principle even with hard-wired, parallel connected supply circuits. However, it can be advantageous if a switching device is provided for switching between the supply circuits. Then an advantage according to the invention more particularly comes to bear in that such a switching device in connection with the intrinsic safety is subject to no special safety or security requirements and as a result effort and expenditure can be kept very low.

The device according to the invention provides a reliable, intrinsically safe current-voltage supply for electric loads in an explosion-proof area and which, particularly as a result of the power limitation, can be advantageously used as a multichannel construction for the connection of e.g. up to eight electric loads (sensors and/or actuators) in the explosion-proof area. In the case of multichannel uses, the device according to the invention is correspondingly provided several times in a housing.

Further advantages and characteristics of the device according to the invention are described in greater detail hereinafter relative to the attached diagrammatic drawings, wherein show:

FIG. 1a A first embodiment of the device according to the invention.

Figure 1B:
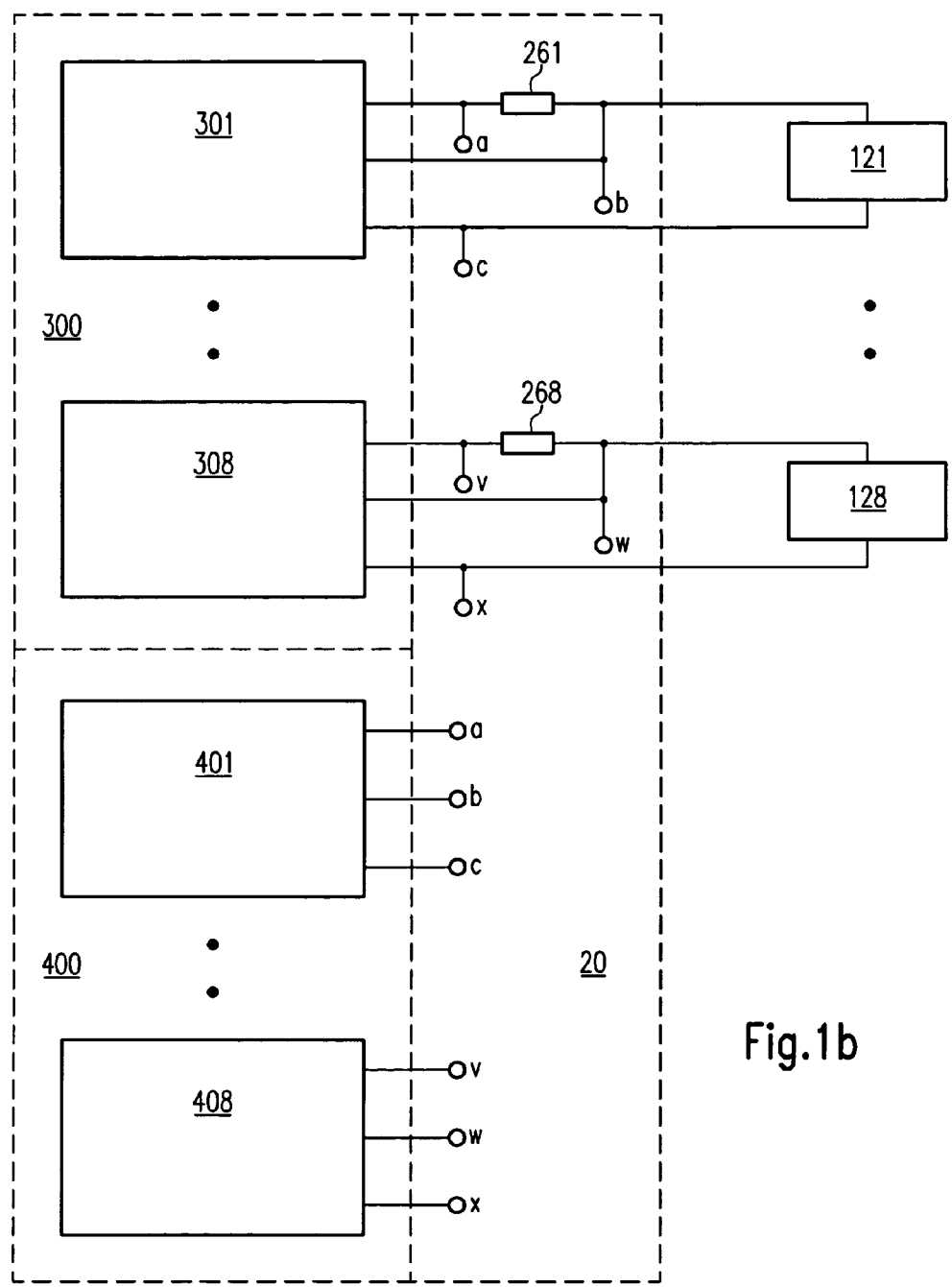

FIG. 1b The layout of a multichannel construction of the device according to the invention.

Figure 2:
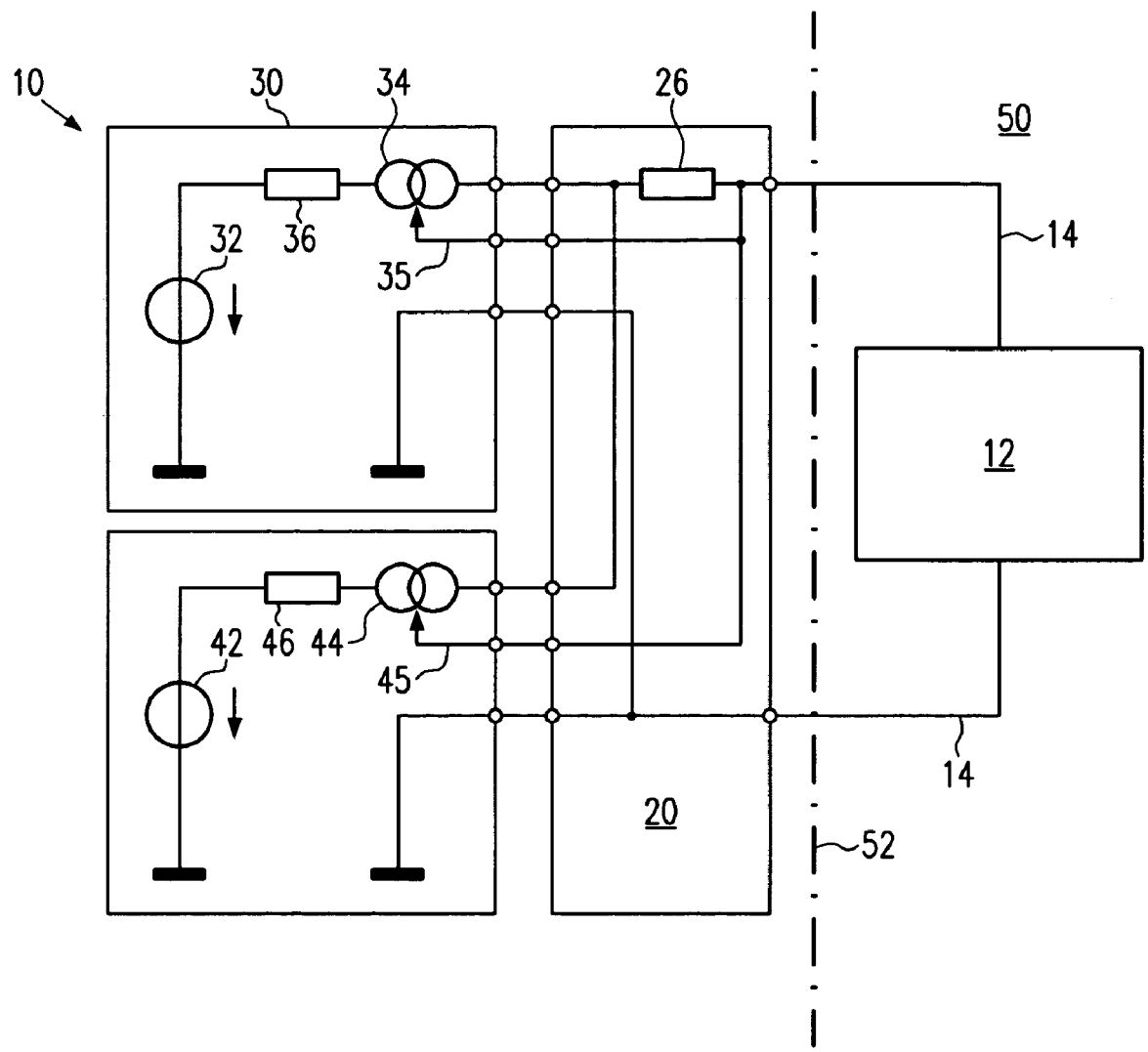

FIG. 2 A second embodiment of the device according to the invention.

Figure 3:
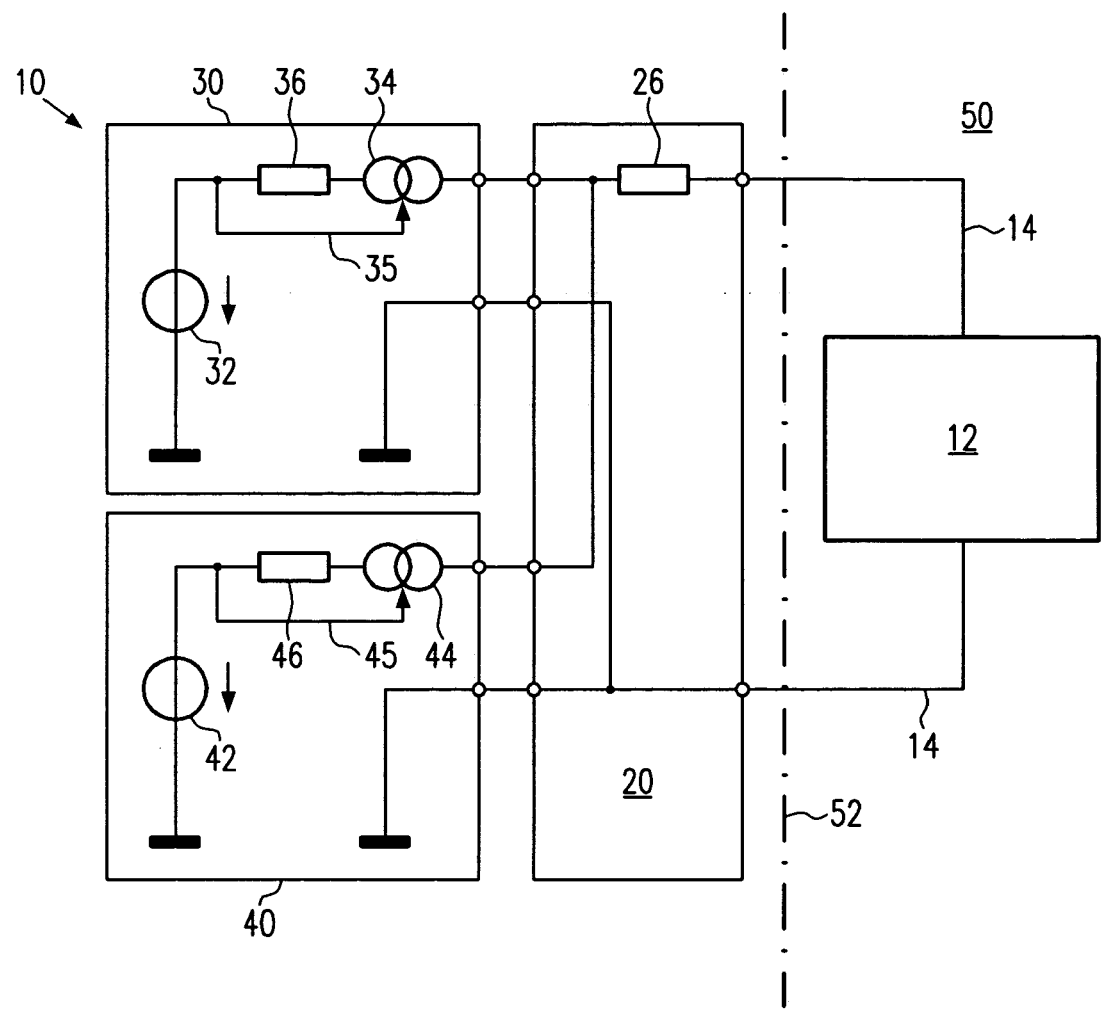

FIG. 3 A third embodiment of the device according to the invention.

Figure 4:
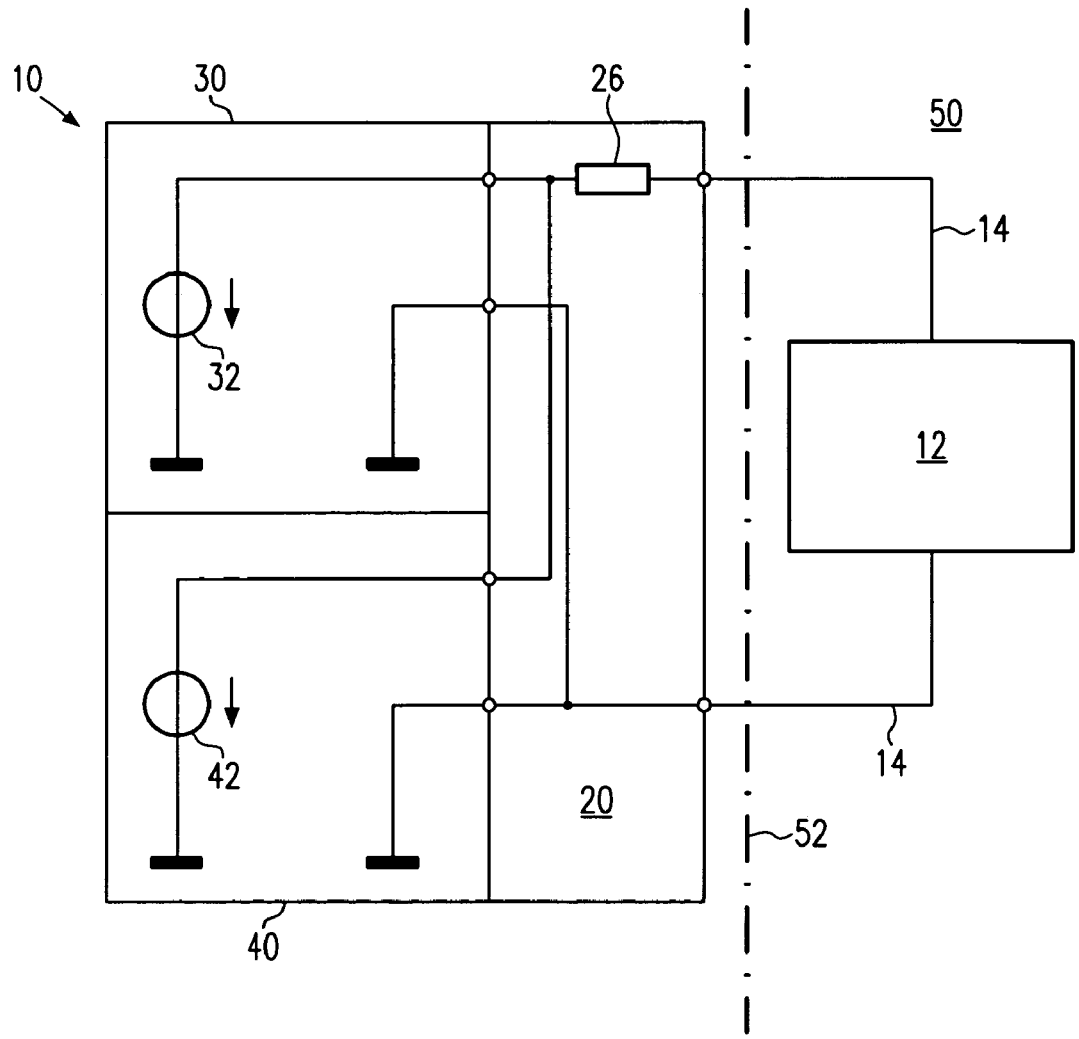

FIG. 4 A fourth embodiment of the device according to the invention.

Figure 5:
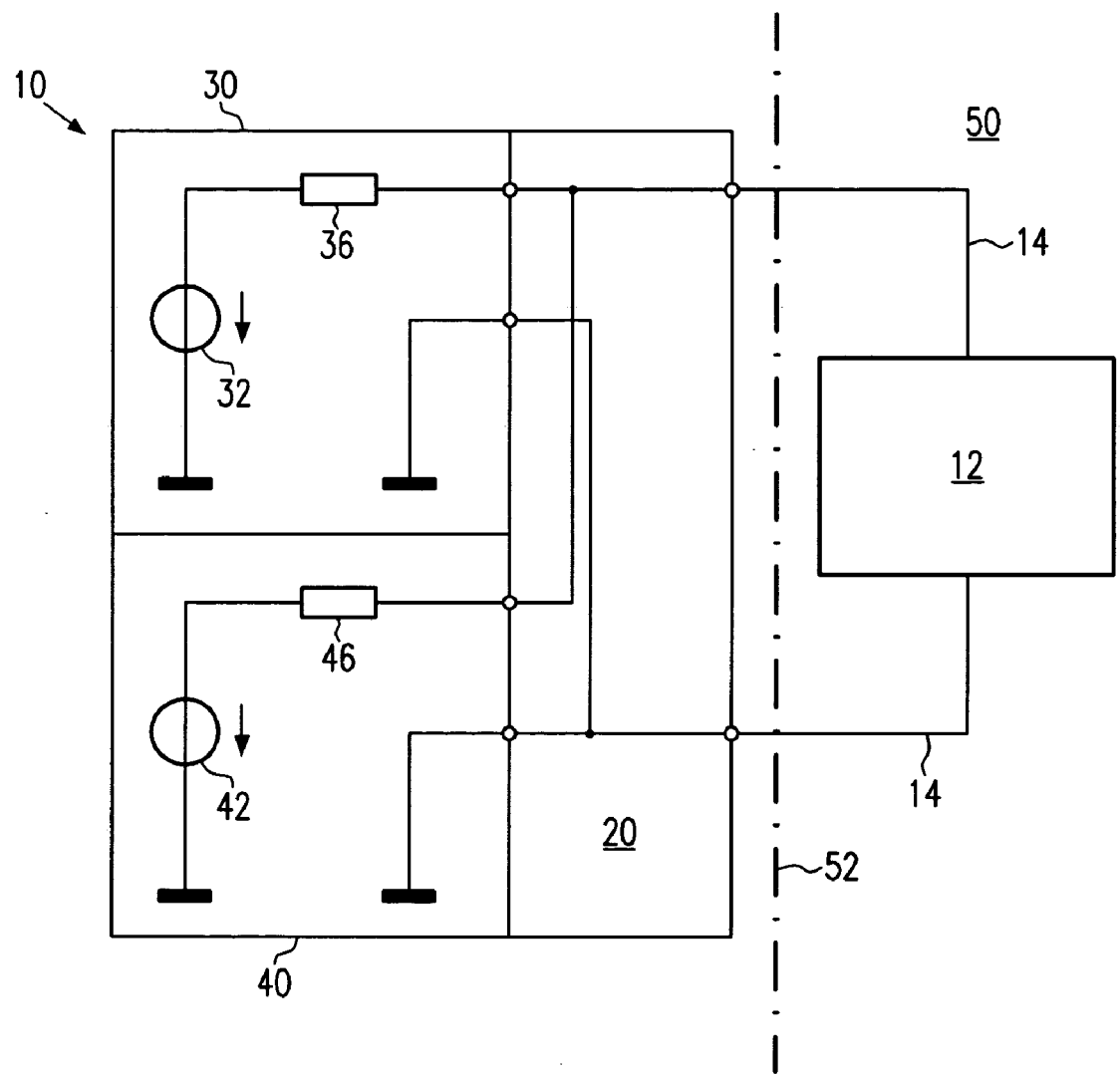

FIG. 5 A fifth embodiment of the device according to the invention.

Figure 6:
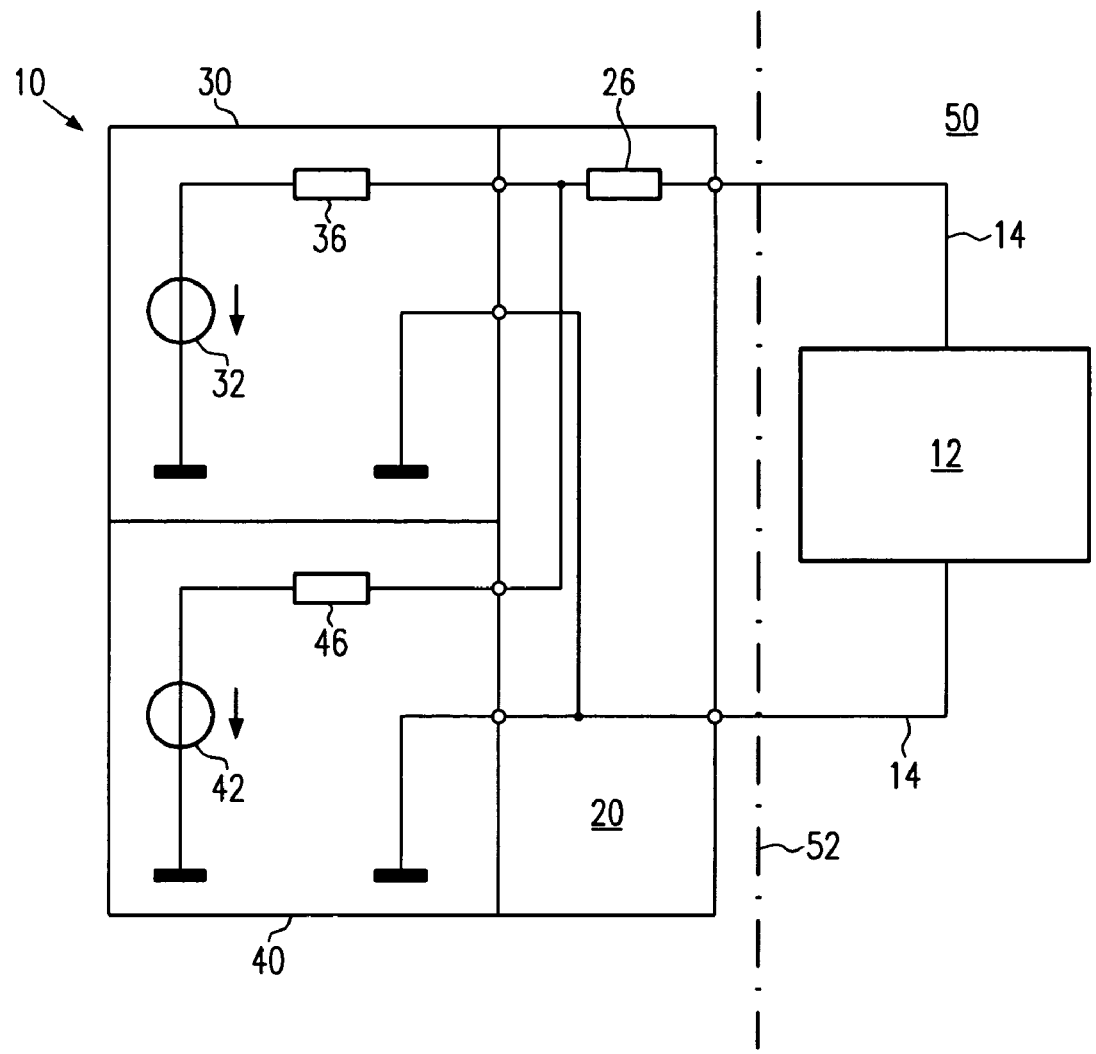

FIG. 6 A sixth embodiment of the device according to the invention.

FIG. 1a diagrammatically shows a first embodiment of a device 10 according to the invention for intrinsically safe, redundant current-voltage supply for an electric load 12 in an explosion-proof area 50. In the drawing the explosion-proof area 50 is bounded by a broken line 52. For the current-voltage supply of the electric load 12 are provided two supply circuits 30, 40 in each case having a voltage source 32, 42. If an even higher degree of supply safety or security is desired, it is obviously possible to use more than two supply circuits. The supply circuits 30, 40 are connected to a plug module 20 by a plurality of plug connections 31, 33, 37 and 41, 43, 47, respectively. A parallel connection of the supply circuits 30, 40 is implemented in the plug module 20 and by means of plug connections 21, 23 an electrical connection of the plug module 20 to connecting leads 14 of the electric load 12 in the explosion-proof area 50 takes place.

In the device 10, power limiting devices 34, 44 are respectively provided in the supply circuits 30, 40 as a protective device as well as an external resistor 26 in the common plug 20. The power limiting devices 34, 44 are constructed as current controls or limiters, the voltage drop across the resistor 26 being evaluated in plug module 20. For this purpose the potential existent at the plug connection 23 is returned with the aid of feedback lines 35 and 45 to the power limiting devices 34, 44.

In the embodiment of FIG. 1a the resistor 26 limiting the current in the explosion-proof area 50 is jointly used. This is implemented in that the resistor 26 is not located in the actual device, i.e. not in the supply circuits 30, 40, but is instead transferred to the housing of the plug module 20.

The loading of the resistor 26 used for current limiting purposes must, according to European standard EN 500 20 only amount to ⅔ of the limits given in the corresponding specification sheet with respect to the voltage and power loss, even when a fault occurs. So that, even in the case of a large number of channels, e.g. plug 20 with eight channels has eight current-limiting resistors 26, the removed current-limiting resistors 26 can be housed in a very small housing, the power transformed in the resistors 26 is electronically limited with the aid of power limiting devices 34, 44. This electronic power limitation is preferably triple redundant per channel.

FIG. 1b diagrammatically shows the layout of a multi-channel construction of the inventive device. A plurality of supply circuits 301 to 308, 401 to 408 is received by a plug module 20. The supply circuits 301 to 308 and 401 to 408, whose terminals are designated a, b, c; v, w, x, are grouped into supply modules 300 and 400. The plug module 20 supplies a plurality of electric loads 121 to 128 in the explosion-proof area. In order to provide intrinsic safety, the plug module 20 contains a plurality of ohmic resistors 261 to 268 and one of the resistors 261 to 268 is associated with each supply circuit 301 to 308 and 401 to 408. Through corresponding wiring in the plug module 20 the supply circuit 301 is connected in parallel with the supply circuit 401, i.e. the terminals a, b and c are in each case interconnected within the plug module, which is not shown so as not to overburden representation in FIG. 1b. Correspondingly the following supply circuits are in each case connected pairwise in parallel right up to the supply circuits 308 and 408. In principle it is also possible to provide a plurality of supply modules 300, 400, which in each case comprise a plurality of supply circuits, for a single plug module 20. In particular, more than two supply circuits can be connected in parallel and this further increases security against faults and failures.

Modifications of the embodiment shown in FIG. 1a are shown in FIGS. 2 to 6. Equivalent components are given the same reference numerals.

In the variant of FIG. 2, in place of the complete current-limiting resistor, only part of the said resistor is placed as a jointly operating resistor 26 in the plug housing 20. Thus, a resistor 36, 46 is provided between the voltage supply means 32, 42 and the power limiting means 34, 44 in each of the supply circuits 30, 40. As a result of this only partial removal of the overall current-limiting resistor, it is possible to reduce the power loss which is converted in the common plug 20 and the volume of the plug 20 is reduced.

With respect to the intrinsic safety, the resistors 36, 46 which form a part of the total resistance are only 50% active. As resistor 26 is functionally 100% active, in the case of the construction according to FIG. 2 there is an overall rise in the resistance limiting the current. This leads to an upper limit for the part of the total resistance which can remain in the supply circuits 30, 40.

If in a device the power conversion in the common plug module 20 is so low that for maintaining intrinsic safety of resistor 26 there is a reserve of at least 50%, the power limiting devices 34, 44 can also use a voltage drop across the resistors 36, 46 as an input variable and this variant is shown in FIG. 3. Thus, per channel it is possible to eliminate a connection between the supply circuits 30, 40 and the plug module 20. However, with regards to the intrinsic safety, in this variant there is a flow of twice the current in resistor 26 for which the power limiting devices 34, 44 are designed.

Particularly simple constructions of the present invention are shown in FIGS. 4 to 6.

In the embodiment of FIG. 4 is based on that of FIG. 1a, but no power limiting devices 34, 44 are provided. In this variant intrinsic safety is provided by a suitable dimensioning of the common resistor 26 or, in the case of multichannel construction, resistors 261 to 268 (cf. FIG. 1b) in the plug housing 20.

In contrast thereto, in the embodiment of FIG. 5, resistors 36, 46 are provided in each of the supply circuits 30, 40 and which compared with the corresponding resistors with non-redundant supply devices are raised considerably, e.g. to more than twice the value, in order to reduce to below 50% of the permitted value a maximum possible current, e.g. in the case of a short-circuit.

For a given current, the resistance rise leads to a greater voltage drop. To compensate this, the output voltages of voltage sources 32, 42 can be correspondingly increased. So that in no-load operation these voltages do not enter the explosion-proof area 50, this voltage rise can either take place in load-dependent manner, or there can be a terminal voltage limitation for no-load operation.

A mixed form of the embodiments of FIGS. 4 and 5 is shown in FIG. 6. In this variant the total resistance effective for current reduction purposes is on the one hand formed by the resistors 36, 46 in supply circuits 30, 40 and on the other by the common resistor 26 in plug 20. In this case and much as in the embodiment of FIG. 2, the resistors 36, 46 in supply circuits 30, 40 are only 50% active, because they are either actually connected in parallel or with a view to the intrinsic safety requirement must be looked upon as connected in parallel. In this case the power loss converted in resistor 26 is lower than in the embodiment of FIG. 4. However, this leads to the advantage that monitoring of the power drop across resistor 26 is only necessary in exceptional cases. In addition, the voltage drop across the resistors 36, 46 is much lower than in the embodiment of FIG. 5, so that here there is generally no need to increase the no-load voltage.

In the case of all embodiments shown in the drawings, the intrinsic safety requirement is ensured, even with hard-wired, parallel-connected supply circuits 30, 40. However, it is advantageous to provide a switching device for switching between individual circuits 30, 40. Then only one supply circuit is always active and the in each case other circuit can permanently perform self-testing to ensure that it is ready to operate. It is only switched on if the first supply circuit has failed.

The invention claimed is:

1. A device for intrinsically safe, redundant current-voltage supply for at least one electric load in an explosion-proof area with at least two supply circuits for providing the current/voltage supply, and with a protective device for intrinsically safe power limitation of the current supplied by the supply circuits to the loads in the explosion-proof area, the supply circuits having as part of the protective device in each case current control and limiting devices, said supply circuits being connectable individually or in parallel to the at least one load in the explosion-proof area by means of a common connecting lead, a resistive current limiting device connected in series to the supply circuits being outside the explosion-proof area as a further part of the protective device, and a voltage drop across the resistive current limiting device being detectable by the current control and limiting devices and evaluated for the intrinsically safe supply of the at least one load in the case of parallel-active supply circuits.

2. The device according to claim 1, wherein the resistive current limiting device has at least one ohmic resistor.

3. The device according to claim 1, wherein a plug module is provided between the supply circuits and a plurality of terminals of the at least one load in the explosion-proof area, and a parallel connection of the supply circuits is implemented in the plug module.

4. The device according to claim 3, wherein the resistive current limiting device is provided in the plug module for limiting the currents of the supply circuits.

5. The device according to claim 1, wherein a corresponding resistor is associated with each supply circuit for resistive current limitation.

6. The device according to claim 1, wherein the voltage drop at the resistor of the resistive current limiting device is designed for a maximum of ⅔ of the resistor's permitted power limit.

7. The device according to claim 1, wherein the current control and limiting devices are designed in a triple redundant manner.

8. The device according to claim 1, wherein the current control and limiting devices are designed according to European standard EN 500 20.

9. The device according to claim 1, wherein a device for increasing the output voltage in the case of a load is provided.

10. The device according to claim 1, wherein a device for limiting the output voltage in the case of no-load operation is provided.

11. The device according to claim 1, wherein a switching device is provided for switching between supply circuits.

12. A device for intrinsically safe, redundant current-voltage supply for at least one electric load in an explosion-proof area with at least two supply circuits for providing the current/voltage supply, and with a protective device for intrinsically safe power limitation of the current supplied by the supply circuits to the loads in the explosion-proof area, the supply circuits having as part of the protective device in each case a resistor and a current control and limiting device, the supply circuits being connectable individually or in parallel to the at least one load in the explosion-proof area by means of a common connecting lead, a resistive current limiting device being connected in series to the supply circuits outside the explosion-proof area as a further part of the protective device, and a voltage drop across the resistors provided in the supply circuits being detectable by the current control and limiting devices and evaluated for the intrinsically safe supply of the at least one load in the case of parallel-active supply circuits.

13. The device according to claim 12, wherein the resistive current limiting device has at least one ohmic resistor.

14. The device according to claim 12, wherein a plug module is provided between the supply circuits and a plurality of terminals of the at least one load in the explosion-proof area and the parallel connection of the supply circuits is implemented in the plug module.

15. The device according to claim 14, wherein the resistive current limiting device is provided in the plug module for limiting the currents of the supply circuits.

16. The device according to claim 12, wherein the voltage drop at the resistor of the resistive current limiting device is designed for a maximum of ⅔ of the resistor's permitted power limit.

17. The device according to claim 12, wherein the current control and limiting device is designed in a triple redundant manner.

18. The device according to claim 12, wherein the current control and limiting devices are designed according to European standard EN 500 20.

19. The device according to claim 12, wherein a device for increasing the output voltage in the case of a load is provided.

20. The device according to claim 12, wherein a device for limiting the output voltage in the case of no-load operation is provided.

21. The device according to claim 12, wherein a switching device is provided for switching between supply circuits.

22. A device for intrinsically safe, redundant current-voltage supply for at least one electric load in an explosion-proof area, with at least two supply circuits for providing the current/voltage supply, and with a protective device for intrinsically safe power limitation of the current supplied by the supply circuits to the loads in the explosion-proof area, each supply circuit having a current control and limiting device, said supply circuits being connectable individually or in parallel to the at least one load in the explosion-proof area by means of a common connecting lead, a resistive current limiting device being connected in series to the supply circuits outside the explosion-proof area as a further part of the protective device, and a voltage drop across the resistive current limiting device being detectable by the current control and limiting devices and evaluated for the intrinsically safe supply of the at least one load in the case of parallel-active supply circuits, said resistive current limiting device having at least one ohmic resistor, and a plug module being provided between the supply circuits and a plurality of terminals of the at least one load in the explosion-proof area, with a parallel connection of the supply circuits being implemented in said plug module.

23. A device for intrinsically safe, redundant current-voltage supply for at least one electric load in an explosion-proof area, with at least two supply circuits for providing the current-voltage supply, and with a protective device for intrinsically safe power limitation of the current supplied by the supply circuits to the loads in the explosion-proof area, each supply circuit having a current control and limiting device, said supply circuits being connectable individually or in parallel to the at least one load in the explosion-proof area by means of a common connecting lead, a resistive current limiting device being connected in series to the supply circuits outside the explosion-proof area, and a voltage drop across the resistors provided in the supply circuits being detectable by the current control and limiting devices and evaluated for the intrinsically safe supply of the at least one load in the case of parallel-active supply circuits, said resistive current limiting device having at least one ohmic resistor, and a plug module being provided between the supply circuits and a plurality of terminals of the at least one load in the explosion-proof area, with a parallel connection of the supply circuits being implemented in said plug module.

* * * * *